United States Patent
Wegner et al.

(10) Patent No.: US 12,390,759 B2
(45) Date of Patent: Aug. 19, 2025

(54) ENGINE DESICCANT RACKS, METHODS OF INSTALLING THE SAME, SYSTEMS FOR PREVENTING CORROSION, AND ARTICULATING CONTACT STRUCTURES

(71) Applicant: The Boeing Company, Arlington, VA (US)

(72) Inventors: Jermaine D. Wegner, Seattle, WA (US); Eric A. Clifton, Seattle, WA (US); William E. Gardiner, Seattle, WA (US); Jeremy C. Raymond, Seattle, WA (US); Nathan H. West, Tulalip, WA (US)

(73) Assignee: The Boeing Company, Arlington, VA (US)

( * ) Notice: Subject to any disclaimer, the term of this patent is extended or adjusted under 35 U.S.C. 154(b) by 138 days.

(21) Appl. No.: 18/315,368

(22) Filed: May 10, 2023

(65) Prior Publication Data
US 2024/0375036 A1    Nov. 14, 2024

(51) Int. Cl.
*B01D 53/22*     (2006.01)
*B01D 53/04*     (2006.01)
(Continued)

(52) U.S. Cl.
CPC ....... *B01D 53/0415* (2013.01); *B01D 53/261* (2013.01); *B64F 5/40* (2017.01);
(Continued)

(58) Field of Classification Search
CPC .............. B01D 53/0415; B01D 53/261; B01D 2253/11; B01D 2257/80; B01D 2259/4575; B64F 5/40
See application file for complete search history.

(56) References Cited

U.S. PATENT DOCUMENTS 1,525,701 A * 2/1925 Rose .................. A47G 25/0664
                                           211/196
1,859,859 A * 5/1932 Zook ...................... A47K 3/283
                                           4/596

(Continued)

FOREIGN PATENT DOCUMENTS

EP            3279437 A1    2/2018

OTHER PUBLICATIONS

American Heritage Dictionary of the English Language, Fifth Edition. 2016 by Houghton Mifflin Harcourt Publishing Company. Published by Houghton Mifflin Harcourt Publishing Company. 2 pages, https://www.thefreedictionary.com/rack (Year: 2016).*

(Continued)

*Primary Examiner* — Anthony R Shumate
(74) *Attorney, Agent, or Firm* — Kolitch Romano Dascenzo Gates LLC

(57) ABSTRACT

In some examples, an engine desiccant rack for suspending one or more bags of a desiccant material within a housing of an aerospace structure includes a platform comprising a first edge region and a second edge region opposite the first edge region. In some examples, a system for preventing corrosion within a housing of a structure includes: a desiccant rack and one or more bags containing a desiccant material. In some examples, a method of installing a desiccant rack within a housing of an aerospace structure includes: installing a platform of the desiccant rack within the housing. In some examples, an articulating contact structure suitable for inclusion in desiccant racks according to the present teachings include: a body and a pivotable joint coupled to the body.

20 Claims, 9 Drawing Sheets

(51) Int. Cl.
*B01D 53/26* (2006.01)
*B64F 5/40* (2017.01)
(52) U.S. Cl.
CPC ...... *B01D 2253/11* (2013.01); *B01D 2257/80* (2013.01); *B01D 2259/4575* (2013.01)

(56) References Cited

U.S. PATENT DOCUMENTS

| | | | | |
|---|---|---|---|---|
| 3,133,645 | A * | 5/1964 | Cecil ...................... | D06F 57/10 |
| | | | | 211/202 |
| 4,828,123 | A * | 5/1989 | Basore .................... | D06F 57/10 |
| | | | | 248/176.1 |
| 5,213,221 | A * | 5/1993 | Raye, Sr. ................ | D06F 57/08 |
| | | | | 211/195 |
| 2009/0093361 | A1* | 4/2009 | Sakatani ................. | B01J 35/39 |
| | | | | 502/309 |
| 2009/0229967 | A1* | 9/2009 | Sakatani ................. | B01J 35/39 |
| | | | | 204/157.3 |
| 2010/0300994 | A1* | 12/2010 | Turner-Wiltshire ... | A47K 10/10 |
| | | | | 211/16 |
| 2015/0089879 | A1 | 4/2015 | Sparks et al. | |
| 2018/0163339 | A1* | 6/2018 | Greenspon ............. | D06F 57/10 |
| 2022/0348400 | A1 | 11/2022 | Pham et al. | |

OTHER PUBLICATIONS

European Patent Office, Extended European Search Report in related App. No. EP24162702, Jul. 12, 2024.

* cited by examiner

ENGINE DESICCANT RACKS, METHODS OF INSTALLING THE SAME, SYSTEMS FOR PREVENTING CORROSION, AND ARTICULATING CONTACT STRUCTURES

FIELD

The present disclosure relates to engine desiccant racks, methods of installing the same, systems for preventing corrosion, and articulating contact structures.

BACKGROUND

Aerospace structures, such as engine housings or cowlings, nacelles, rocket nozzles, and/or the like are susceptible to corrosion due to moisture build up within the structures. Accordingly, desiccant materials are commonly used to dehydrate aerospace structures during storage. The desiccant materials remove condensation and other moisture accumulated within the aerospace structure during use, such as during flight. Desiccant materials also may prevent condensation from accumulating within the aerospace structures during storage.

Conventional systems for deploying desiccant materials typically include stacking bags containing desiccant materials in an opening of the aerospace structure (e.g., an engine inlet). Stacking bags containing desiccant materials in this manner results in underutilization of the desiccant material, as a large portion of the surface area of each bag is obscured, either by adjacent bags or by walls of the aerospace structure. These conventional systems typically result in desiccant utilization of less than 25%.

SUMMARY

Apparatuses and methods for suspending bags of desiccant material within housings of aerospace structures are disclosed. In some examples, an engine desiccant rack for suspending one or more bags of a desiccant material within a housing of an aerospace structure includes a platform comprising a first edge region and a second edge region opposite the first edge region. In some examples, the platform is configured to contact a first portion of a nonplanar wall of the housing at the first edge region and a second portion of the nonplanar wall of the housing at the second edge region, such that the platform is suspended by the nonplanar wall.

In some examples, a system for preventing corrosion within a housing of a structure includes: a desiccant rack and one or more bags containing a desiccant material. In some examples, the desiccant rack is the engine desiccant rack described above. In some examples, each bag of the one or more bags containing a desiccant material is suspended from the platform such that a largest face of each bag is oriented parallel to a plane defined by an opening of the housing.

In some examples, a method of installing a desiccant rack, such as the desiccant rack described above, within a housing of an aerospace structure includes: installing a platform of the desiccant rack within the housing. In some examples, installing the platform of the desiccant rack within the housing includes installing the platform such that first and second edge regions of the platform contact a nonplanar wall of the housing and the platform is suspended within the housing.

In some examples, an articulating contact structure suitable for inclusion in desiccant racks described above includes: a body and a pivotable joint. In some examples, the body includes a central hub and at least three legs extending from the central hub. In some examples, the pivotable joint is coupled to the central hub opposite the at least three legs.

DESCRIPTION

Apparatuses and methods for suspending bags of desiccant material within housings of aerospace structures are disclosed. Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

Figure 1:
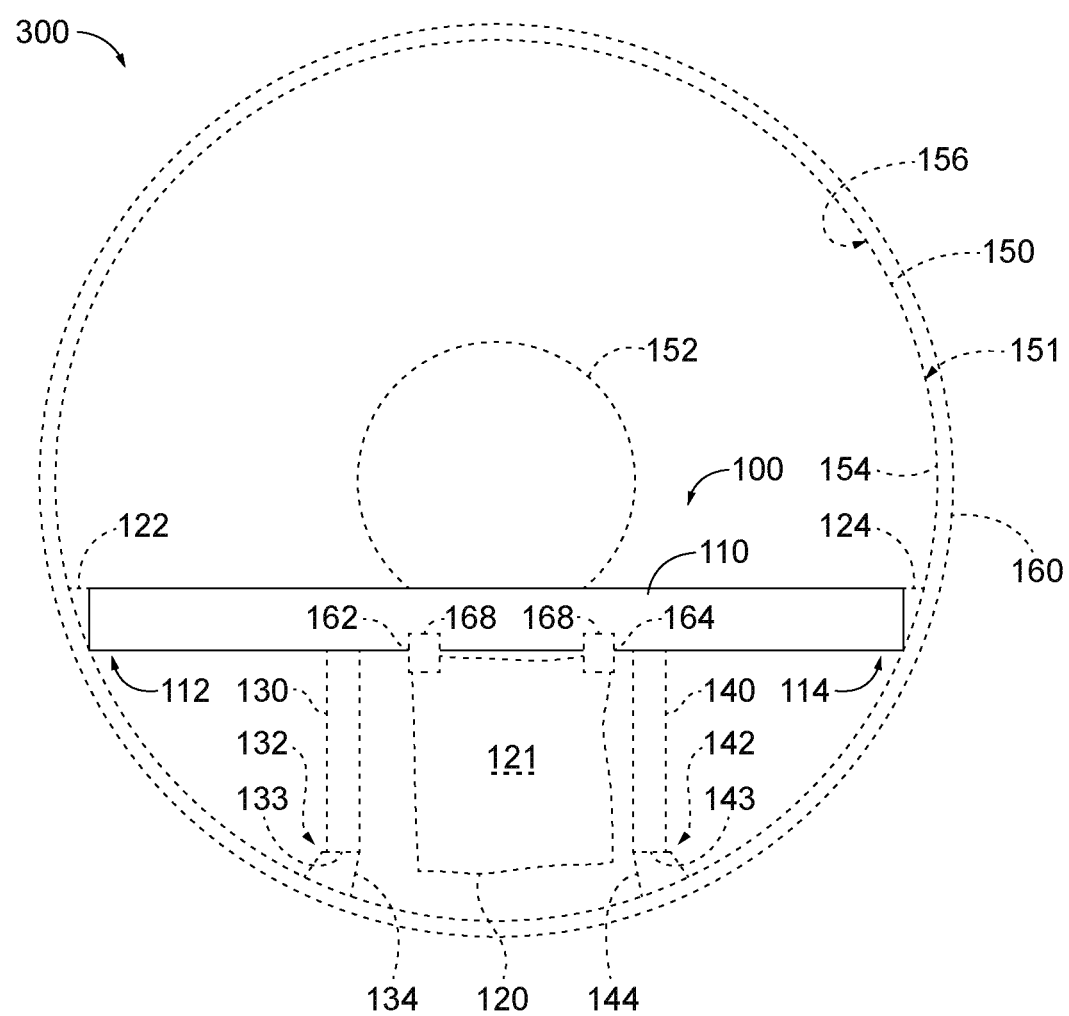
FIG. 1 is a schematic elevation view of an illustrative system for preventing corrosion according to the present disclosure, depicted as installed in a housing of an aerospace structure. The illustrative system for preventing corrosion includes an illustrative desiccant rack.
Figure 2:
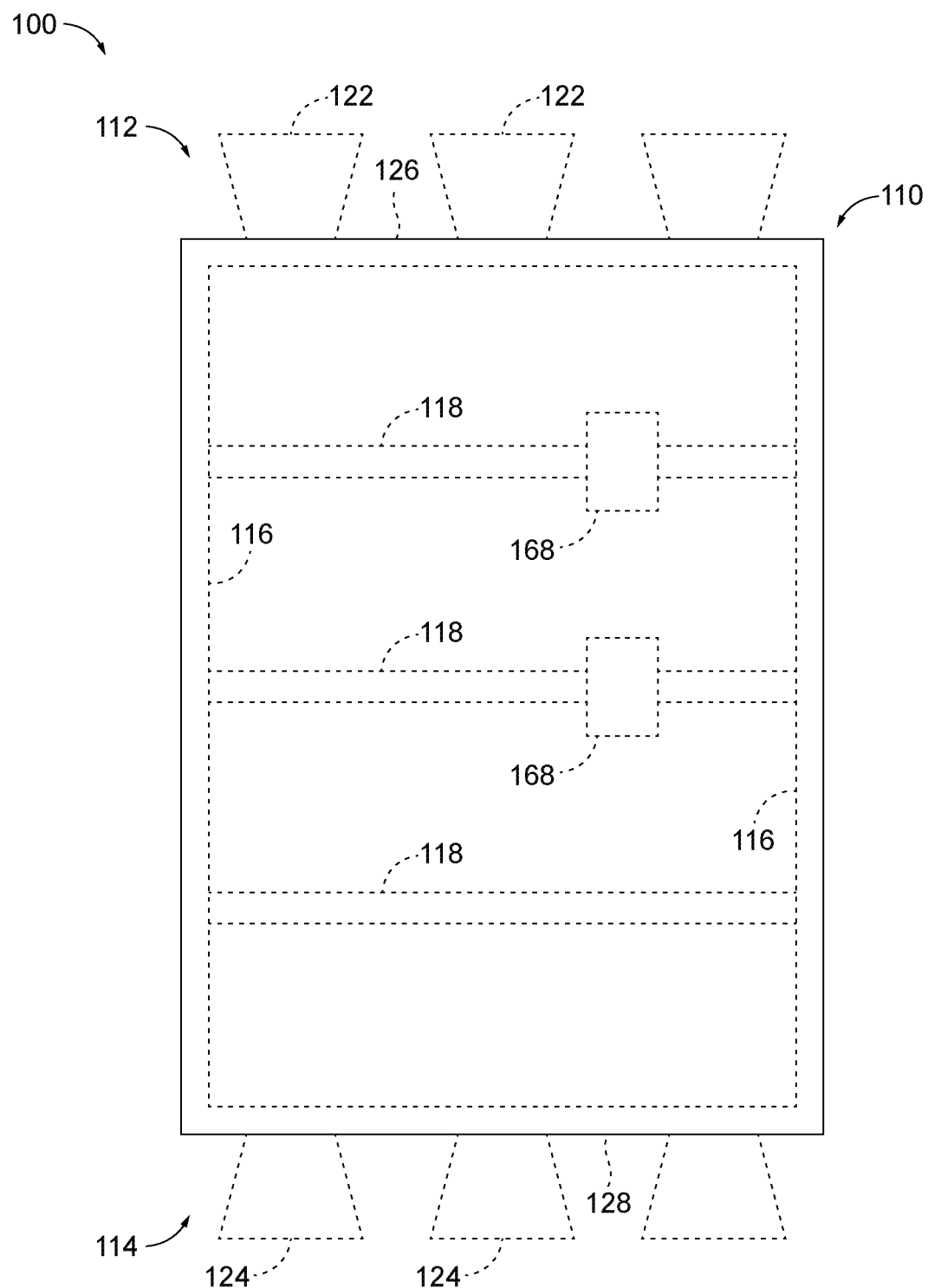
FIG. 2 is a schematic top plan view of the desiccant rack of FIG. 1.

As schematically illustrated in FIGS. 1 and 2, a desiccant rack 100 in accordance with the present teachings includes at least a platform 110 comprising a first edge region 112 and a second edge region 114 opposite the first edge region. Platform 110 is configured to contact a first portion of a nonplanar wall 154 of a housing of an aerospace structure at first edge region 112 and to contact a second portion of nonplanar wall 154 at second edge region 114, such that platform 110 is suspended by nonplanar wall 154. Desiccant rack 100 is configured such that one or more bags 120 of a desiccant material (AKA desiccant bags) may be suspended from the desiccant rack within housing 150, such that utilization of desiccant material within bags 120 is maximized. Accordingly, in some examples, platform 110 of desiccant rack 100 is configured to suspend one or more bags 120 of a desiccant material such that a largest face 121 of each bag 120 is oriented parallel to a plane defined by an opening 156 of housing 150. In some examples, platform 110 is configured to suspend one or more bags 120 of a desiccant material such that a largest face 121 of each bag 120 is oriented parallel to a face of an engine 152 received by housing 150.

Desiccant rack 100 may be configured to suspend bags 120 of desiccant material within any suitable housing 150 of any suitable aerospace structure. Accordingly, while housing 150 is depicted in FIG. 1 as having a substantially cylindrical shape, desiccant rack 100 is configured to interface with housings having any suitable shape and/or size, such as cylindrical, conical, frustoconical, oblong, amorphous, irregular, and/or the like. Similarly, while housing 150 is depicted as having a substantially circular cross-section, desiccant rack 100 is configured to interface with housings having any suitable cross-section, such as circular, oval, stadium-shaped, oblong, irregular, amorphous, and/or the like. However, as platform 110 is configured to be suspended by nonplanar wall 154, suitable housings 150 generally include angled and/or curved walls, which may interface with first edge region 112 and second edge region 114 of platform 110. Accordingly, in some examples, housing 150 comprises an engine cowling. In some examples, housing 150 comprises a nacelle 158 defining a cylindrical opening 156 receiving platform 110.

As bags 120 are suspended from platform 110 such that a largest face 121 of each bag is parallel to a plane defined by opening 156, air entering the housing through opening 156 contacts and/or passes through the bags, dehydrating the air. Similarly, stagnant air contained within the housing is dehydrated by the bags containing desiccant material. Furthermore, as a majority (e.g., greater than 50%, greater than 60%, greater than 75%, greater than 80%, greater than 90%, etc.) of a total surface area of each bag is exposed to air within the housing, moisture within the housing is absorbed by the bags containing desiccant material more quickly than when compared with existing systems and methods for dehydrating housings of aerospace structures.

Platform 110 may have any suitable shape and/or size configured to support bags containing a desiccant material, such as planar, curved, angled, irregular, and/or the like. In some examples, as schematically illustrated in dashed lines in FIG. 2, platform 110 comprises a pair of rails 116 and a plurality of rungs 118 extending between pair of rails 116. In some examples, each rail of the pair of rails is configured to extend from first edge region 112 of platform 110 to second edge region 114 of platform 110, forming a substantially ladder-shaped structure. In some examples, first edge region 112 of platform 110 comprises a first rung 126 of plurality of rungs 118 and second edge region 114 of platform 110 comprises a second rung 128 of plurality of rungs 118. Accordingly, in these examples, platform 110 comprises a planar structure having a substantially rectangular silhouette. In some examples, platform 110 is configured to be oriented substantially horizontally when installed within housing 150. In some examples, platform 110 comprises a unitary plane of material.

In some examples, as also illustrated schematically in dashed lines in FIGS. 1 and 2, platform 110 further comprises a coupling mechanism 168 configured to couple each bag 120 to desiccant rack 100. Coupling mechanism 168 may comprise any suitable structure configured to couple a bag to desiccant rack 100, such as clips, hooks, tabs, and/or the like. In some examples, as depicted in FIG. 2, coupling mechanism 168 is coupled to rungs 118 of platform 110. However, coupling mechanism 168 may be coupled to any suitable portion of platform 110, such as rails 116, rungs 118, edge regions 112, 114, and/or the like.

In some examples, as illustrated schematically in FIGS. 1 and 2, first edge region 112 and second edge region 114 of platform 110 are respectively defined by at least one articulating contact structure configured to interface with nonplanar wall 154. Accordingly, in some examples, first edge region 112 is defined by at least a first articulating contact structure 122 coupled to first rung 126, and second edge region 114 is defined by at least a second articulating contact structure 124 coupled to second rung 128. Articulating contact structures 122 and 124 are configured to interface with nonplanar surfaces, such as nonplanar wall 154, such that contact between desiccant rack 100 and the wall is maximized. Accordingly, articulating contact structures 122, 124 may pivot, rotate, adjust, and/or the like, adapting the first and second edge region to nonplanar wall 154. In some examples, articulating contact structures 122, 124 are substantially identical to articulating contact structure 200, described below with respect to FIGS. 4-12. In some examples, articulating contact structures 122, 124 comprise rollers, suction cups, cushions, fingers, and/or the like. In some examples, first edge region 112 is defined by a first plurality of articulating contact structures 122 spaced along first rung 126 and second edge region 114 is defined by a second plurality of articulating contact structures 124 spaced along second rung 128.

In some examples, as illustrated schematically in FIG. 1, desiccant rack 100 further comprises a first elevating support 130 extending substantially orthogonally from platform 110. Extending substantially orthogonally comprises extending within 15 degrees of orthogonal. First elevating support 130 comprises a third edge region 132 disposed at a distal end 133 of the first elevating support, such that third edge region 132 is configured to contact a third portion of nonplanar wall 154. In some examples, first elevating support 130 is configured to be oriented substantially vertically when desiccant rack 100 is installed within a housing, such as housing 150. First elevating support 130 is configured to support platform 110, such that platform 110 is supported both by contact with nonplanar wall 154 at first and second edge region 112, 114 and by elevating support 130. In some examples, third edge region 132 is defined by at least a third articulating contact structure 134. As described above, articulating contact structure 134 is configured to interface with nonplanar surfaces, such as nonplanar wall 154, such that contact between desiccant rack 100 and the wall is maximized. Accordingly, articulating contact structure 134 may pivot, rotate, adjust, and/or the like, adapting the third edge region to nonplanar wall 154. In some examples, articulating contact structure 134 is substantially identical to articulating contact structure 200, described below with respect to FIGS. 4-12. In some examples, articulating contact structure 134 comprises a roller, suction cup, cushion, finger, and/or the like. In some examples, third edge region 132 is defined by a third plurality of articulating contact structures 134 spaced along distal end 133 of first elevating support 130. In some examples, first elevating support 130 comprises a single rung defining distal end 133 and a pair of rails extending substantially orthogonally from platform 110. In some examples, first elevating support 130 comprises a unitary plane of material extending orthogonally from platform 110 and terminating at distal end 133.

In some examples, as illustrated schematically in FIG. 1, desiccant rack 100 further comprises a second elevating support 140 extending substantially orthogonally from platform 110. Extending substantially orthogonally may comprise extending at any suitable angle within a selected deviation from 90 degrees, such as within 5 degrees, within 10 degrees, within 15 degrees, and/or the like. Second elevating support 140 comprises a fourth edge region 142 disposed at a distal end 143 of the second elevating support, such that fourth edge region 142 of second elevating support 140 contacts a fourth portion of nonplanar wall 154. In some examples, second elevating support 140 is configured to be oriented substantially vertically when desiccant rack 100 is installed within a housing, such as housing 150. Second elevating support 140 is configured to support platform 110, such that platform 110 is supported both by contact with nonplanar wall 154 and by elevating supports 130, 140. While first elevating support 130 and second elevating support 140 extend substantially orthogonally from platform 110, extending substantially orthogonally may comprise any suitable angle which provides support to platform 110 from below, such as between 60 degrees and 120 degrees, between 75 degrees and 105, degrees, between 80 degrees and 110 degrees, and/or the like. In some examples, first elevating support 130 and second elevating support 140 extend away from each other such that the platform, first elevating support, and second elevating support form a substantially trapezoidal shape when viewed from the angle depicted in FIG. 1. In some examples, first elevating support 130 and second elevating support 140 are substantially parallel and extend from platform 110 at right angles. In some examples, second elevating support 140 comprises a single rung defining distal end 143 and a pair of rails extending substantially orthogonally from platform 110. In some examples, second elevating support 140 comprises a unitary plane of material extending orthogonally from platform 110 and terminating at distal end 143.

In some examples, fourth edge region 142 is defined by at least a fourth articulating contact structure 144. As described above, articulating contact structure 144 is configured to interface with nonplanar surfaces, such as nonplanar wall 154, such that contact between desiccant rack 100 and the wall is maximized. Accordingly, articulating contact structure 144 may pivot, rotate, adjust, and/or the like, adapting the fourth edge region 142 to nonplanar wall 154. In some examples, articulating contact structures 144 is substantially identical to articulating contact structure 200, described below with respect to FIGS. 4-12. In some examples, articulating contact structure 144 comprises a roller, suction cup, cushion, finger, and/or the like. In some examples, fourth edge region 142 is defined by a fourth plurality of articulating contact structures 144 spaced along distal end 143 of second elevating support 140.

Desiccant racks in accordance with the present teachings may comprise any suitable materials, such as metals (e.g., aluminum, steel, etc.), composites (e.g., carbon fiber, etc.), polymers (e.g., PVC (polyvinylidene chloride), PET (polyethylene terephthalate), etc.), and/or the like.

As schematically illustrated in FIGS. 1 and 2, system 300 for preventing corrosion within a housing 150 of a structure in accordance with the present teachings includes at least desiccant rack 100 and one or more bags 120 containing a desiccant material, where each bag 120 is suspended from platform 110 of desiccant rack 100, such that a majority of a surface area of each bag is exposed to air within the housing. In some examples, a majority of a surface area of each bag comprises (e.g., greater than 50% of a surface area of the bag, greater than 60% of a surface area of the bag, greater than 75% of a surface area of the bag, greater than 80% of a surface area of the bag, greater than 90% of a surface area of the bag is exposed to air within the housing. In other words, in some examples, the bags are suspended in such a way that the bags do not contact each other. In some examples, each bag 120 is suspended such that a largest face 121 of each bag is oriented parallel to a plane 151 defined by an opening of the housing. In some examples, each bag 120 is suspended such that a largest face 121 of each bag is oriented orthogonal to a plane 151 defined by an opening of the housing.

Bags 120 may contain any suitable desiccant material for dehydrating aerospace structures, such as silica gel, bentonite clay, montmorillonite clay, calcium chloride, and/or the like. Generally, bags 120 included within system 300 comprise a breathable, flexible material, such as fabric, porous polymer, and/or the like which facilitates the permeability of the bag to air. Accordingly, moisture within air contained within housing 150 is dehydrated as the air passes through bags 120 and contacts the desiccant material contained therein.

In some examples, bags 120 further comprise one or more ties forming a coupling mechanism 168, the ties extending from respective corners of the bag. Accordingly, bags 120 may be coupled to platform 110 of desiccant rack 100 by tying each tie around a portion of platform 110. In examples where platform 110 comprises a pair of rails 116 and a plurality of rungs 118 extending between the pair of rails, bags 120 may be coupled to platform 110 by tying a first corner 162 of a bag 120 to a first rung of the plurality of rungs and by tying a second corner 164 of a bag 120 to a second rung of the plurality of rungs, suspending the one or more bags between a pair of rungs of the plurality of rungs. In some examples, bags 120 may be coupled to platform 110 by tying a first corner 162 of a bag 120 to a first rail of the pair of rails 116 and by tying a second corner 164 of the bag to a second rail of the pair of rails, suspending the one or more bags from a rail of the pair of rails.

In some examples, as described above, desiccant rack 100 further comprises a coupling mechanism 168 configured to couple bags 120 to platform 110. Coupling mechanism 168 may comprise any suitable structure configured to couple a bag to desiccant rack 100, such as clips, hooks, tabs, and/or the like. In some examples, coupling mechanism 168 comprises one or more clips, such that each bag may be coupled to the platform by the one or more clips.

In some examples, system 300 further comprises a cover 160 configured to obscure the opening of the housing, such that desiccant rack 100 and bags 120 of desiccant material are sealed within a compartment defined by cover 160 and housing 150 when the cover is installed. Cover 160 may comprise any suitable airtight material, such as coated fabric, metal, plastics, and/or the like. Accordingly, when housing 150 is covered by cover 160, bags 120 of desiccant material are sealed within the compartment along with any moisture accumulated within the housing during use of the aerospace structure, such as during flight. Bags 120 of desiccant material also prevent the accumulation of moisture within the housing during storage. Moisture is removed from the air as the moisture contacts the desiccant material and is absorbed by the desiccant material. Accordingly, as desiccant rack 100 suspends bags 120 such that a large portion of the surface area of the bags is exposed, desiccant material within the bags is utilized at a higher rate when compared with conventional methods.

Figure 3:
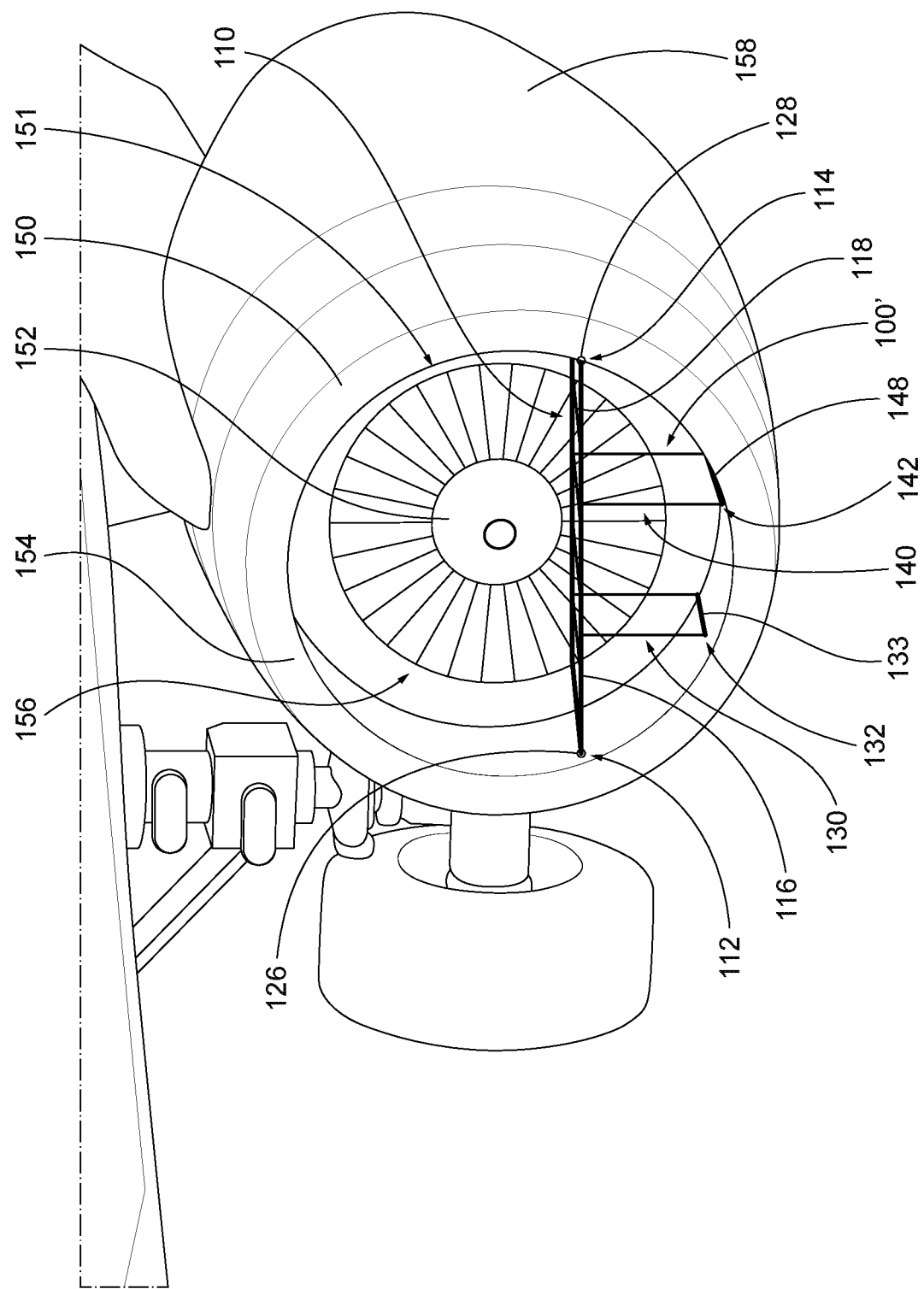
FIG. 3 is an isometric view of an illustrative desiccant rack and engine housing according to the present disclosure.

Turning now to FIG. 3, an illustrative non-exclusive example of desiccant racks in accordance with the present teachings, such as desiccant rack 100 is illustrated. Where appropriate, the reference numerals from the schematic illustrations of FIGS. 1-2 are used to designate corresponding parts of the examples of FIG. 3; however, the example of FIG. 3 is non-exclusive and does not limit desiccant racks 100 to the illustrated embodiments of FIG. 3. That is, desiccant racks 100 are not limited to the specific embodiments of FIG. 3, and desiccant racks 100 may incorporate any number of the various aspects, configurations, characteristics, properties, etc. of desiccant racks 100 that are illustrated in and discussed with reference to the schematic representations of FIGS. 1-2 and/or the embodiment of FIG. 3, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to the examples of FIG. 3; however, it is within the scope of the present disclosure that the previously discussed features, variants, etc. may be utilized with the example of FIG. 3.

As seen in FIG. 3, desiccant rack 100' is an example of a desiccant rack 100 including a platform 110 and first and second elevating supports 130 and 140. Platform 110 comprises a pair of rails 116 and a plurality of rungs 118 extending between pair of rails 116. Each rail of the pair of rails is configured to extend from first edge region 112 of platform 110 to second edge region 114 of platform 110, forming a substantially ladder-shaped structure. In the example depicted in FIG. 3, first edge region 112 of platform 110 comprises a first rung 126 of plurality of rungs 118 and second edge region 114 of platform 110 comprises a second rung 128 of plurality of rungs 118. First edge region 112 and second edge region 114 of platform 110 are respectively defined by at least one articulating contact structure configured to interface with nonplanar wall 154. Accordingly, in some examples, first edge region 112 is defined by at least a first articulating contact structure 122 coupled to first rung 125, and second edge region 114 is defined by at least a second articulating contact structure 124 coupled to second rung 128.

Desiccant rack 100' further comprises first elevating support 130 and second elevating support 140, which extend orthogonally from platform 110. First elevating support 130 comprises a third edge region 132 disposed at a distal end 133 of the first elevating support, such that third edge region 132 is configured to contact a third portion of nonplanar wall 154. Third edge region 132 is defined by at least a third articulating contact structure 134. Second elevating support 140 comprises a fourth edge region 142 disposed at a distal end 143 of the second elevating support, such that fourth edge region 142 of second elevating support 140 contacts a fourth portion of nonplanar wall 154. First elevating support 130 and second elevating support 140 is configured to support platform 110, such that platform 110 is supported both by contact with nonplanar wall 154 and by elevating supports 130, 140. Fourth edge region 142 is defined by at least a fourth articulating contact structure 144.

FIG. 3 depicts desiccant rack 100' as received by a nacelle 158 of an aircraft structure. Nacelle 158 is an example of a suitable housing 150 in which desiccant racks, such as desiccant rack 100 and desiccant rack 100' may be installed. Nacelle 158 defines an opening 156 in which desiccant rack 100' is installed. Nacelle 158 contains an engine 152. Accordingly, desiccant rack 100', as installed in nacelle 158, is configured to prevent corrosion within engine 152.

Turning now to FIGS. 4-12, an illustrative non-exclusive example of articulating contact structures in accordance with the present teachings, such as articulating contact structures 122, 124, 134, 144 is illustrated. The example of FIGS. 4-12 is non-exclusive and does not limit articulating contact structures 122, 124, 134, 144 to the illustrated embodiments of FIGS. 4-12. That is, articulating contact structures 122, 124, 134, 144 are not limited to the specific embodiments of 4-12, and articulating contact structures 122, 124, 134, 144 may incorporate any number of the various aspects, configurations, characteristics, properties, etc. of articulating contact structures 122, 124, 134, 144 that are illustrated in and discussed with reference to the schematic representations of FIGS. 1-2 and/or the embodiments of FIGS. 4-12, as well as variations thereof, without requiring the inclusion of all such aspects, configurations, characteristics, properties, etc.

Figure 4:
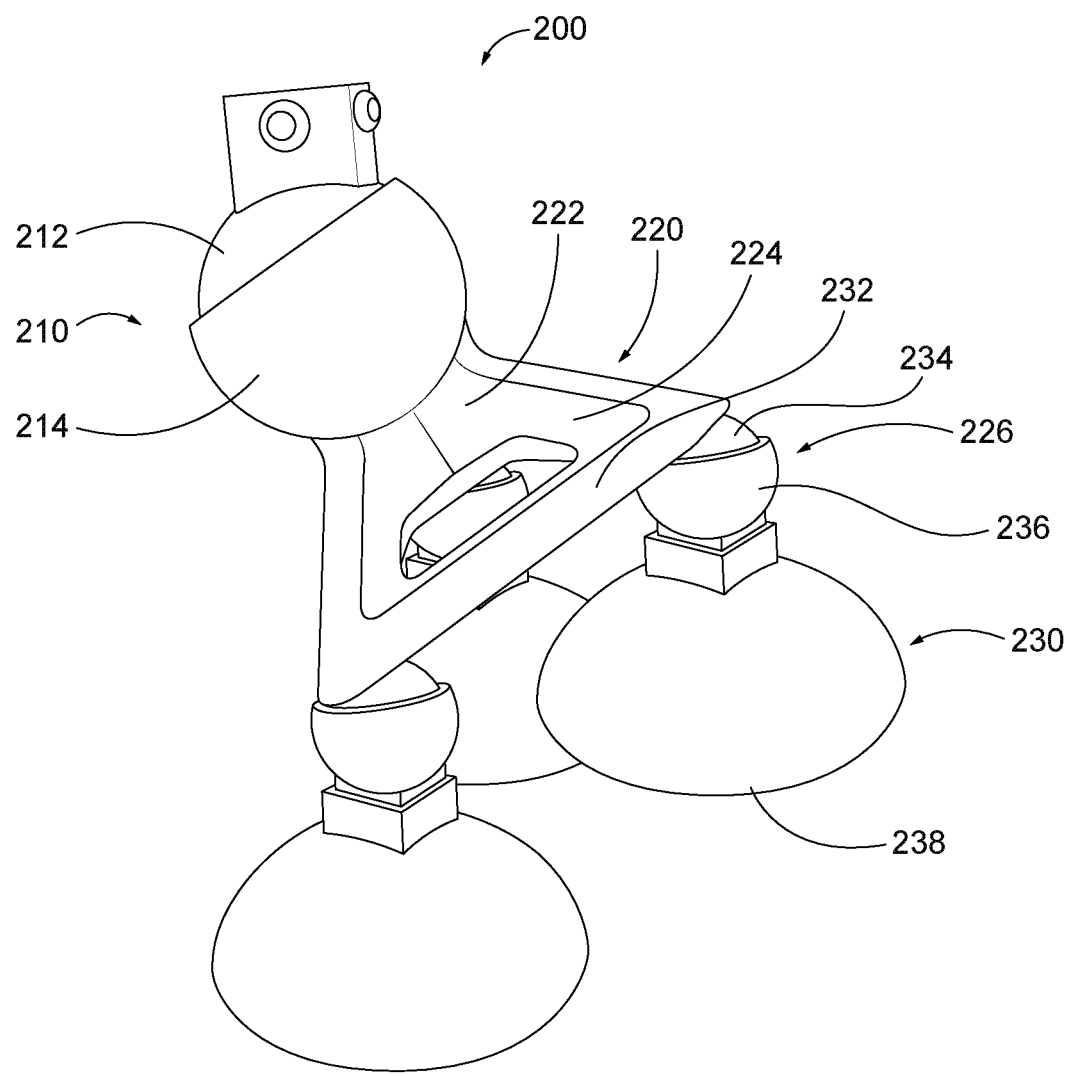
FIG. 4 is an isometric view of a first illustrative articulating contact structure suitable for inclusion in the desiccant racks of FIGS. 1-3, depicted in an angled orientation. The first illustrative articulating contact structure comprises a body and a plurality of feet coupled to the body.
Figure 5:
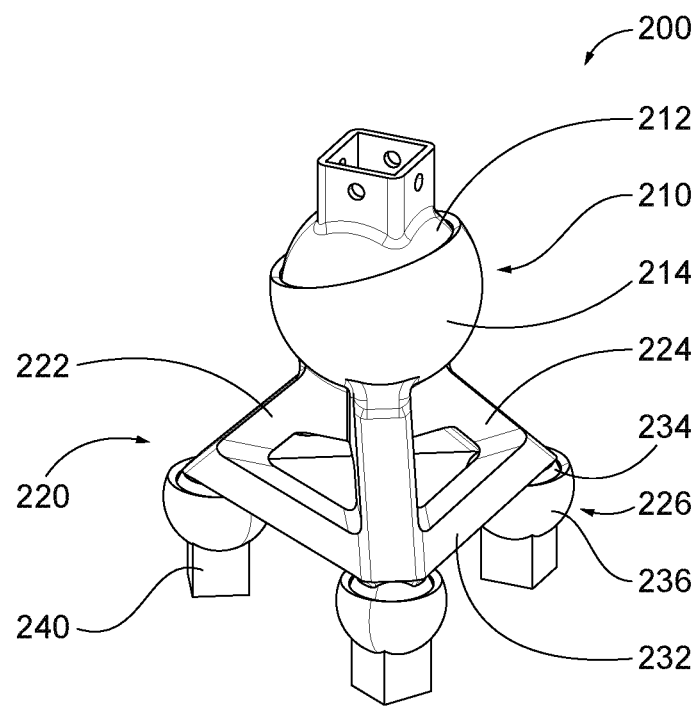
FIG. 5 is an isometric view of a first illustrative body suitable for use in the first illustrative articulating contact structure of FIG. 4, depicted in a vertical orientation.
Figure 6:
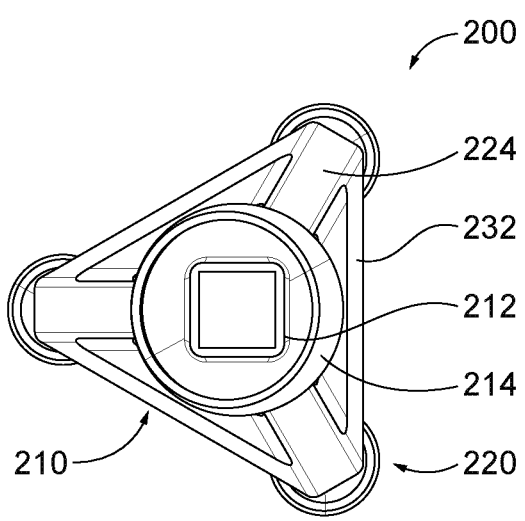
FIG. 6 is a top plan view of the first illustrative body of FIG. 5.
Figure 7:
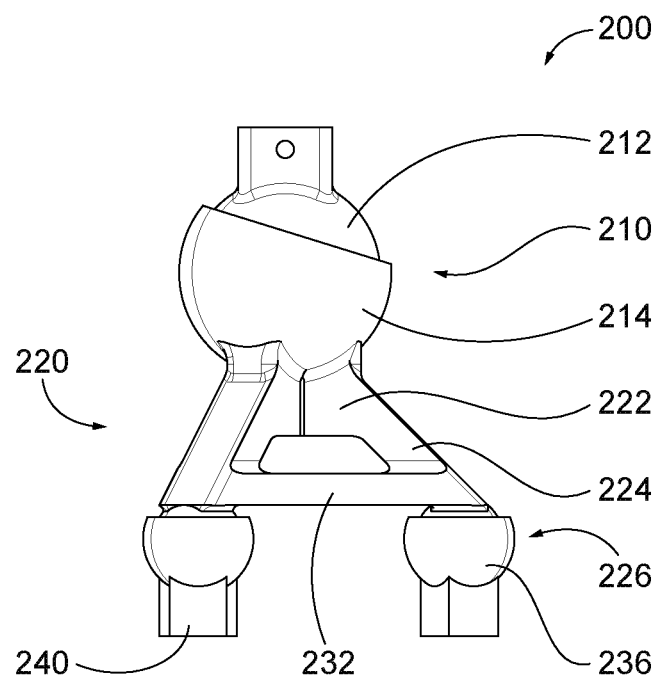
FIG. 7 is a side elevation view of the first illustrative body of FIG. 5.
Figure 8:
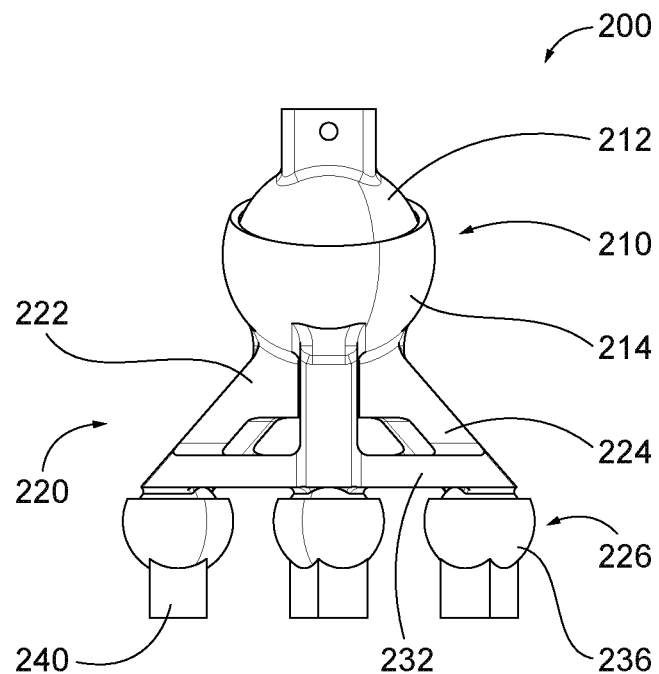
FIG. 8 is a front elevation view of the first illustrative body of FIG. 5.
Figure 9:
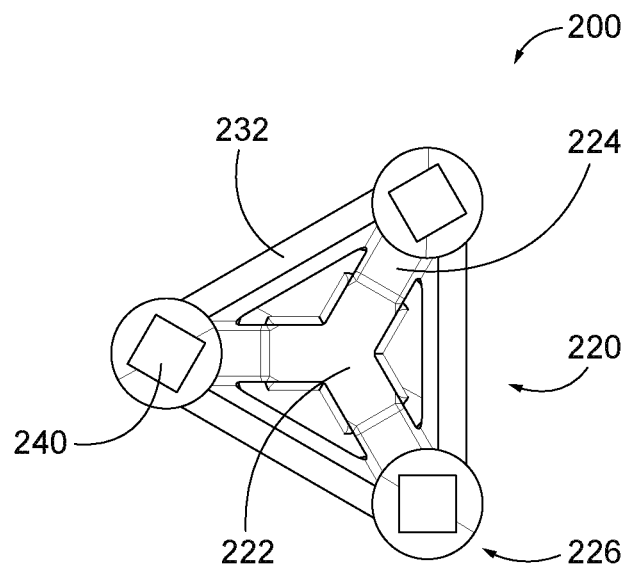
FIG. 9 is a bottom plan view of the first illustrative body of FIG. 5.
Figure 10:
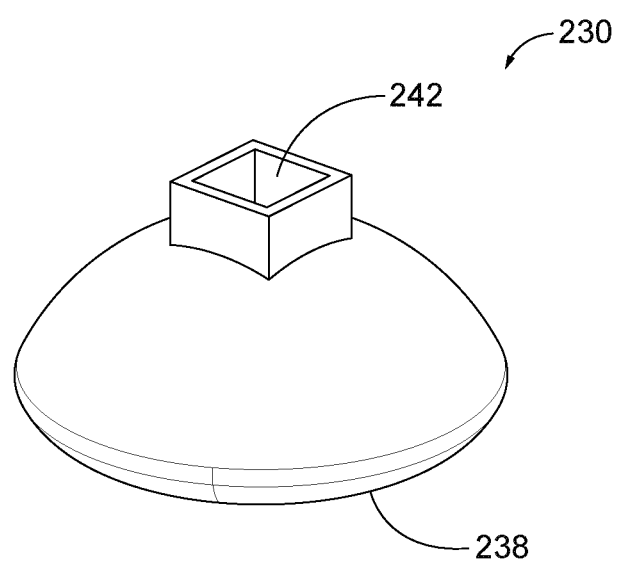
FIG. 10 is an isometric view of a first illustrative foot suitable for use in the first illustrative articulating contact structure of FIG. 4, depicted in a vertical orientation.
Figure 11:
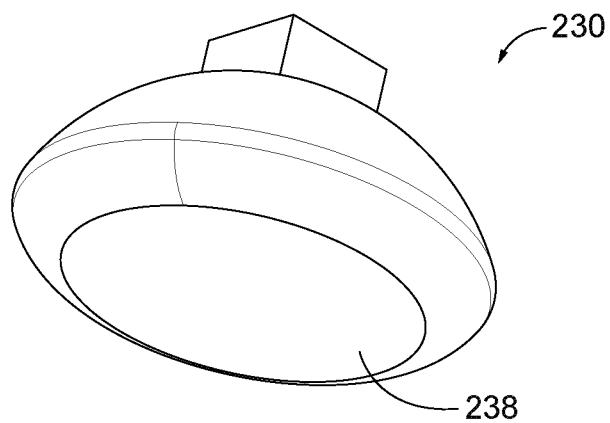
FIG. 11 is an isometric view of the first illustrative foot of FIG. 10, depicted in an angled orientation.
Figure 12:
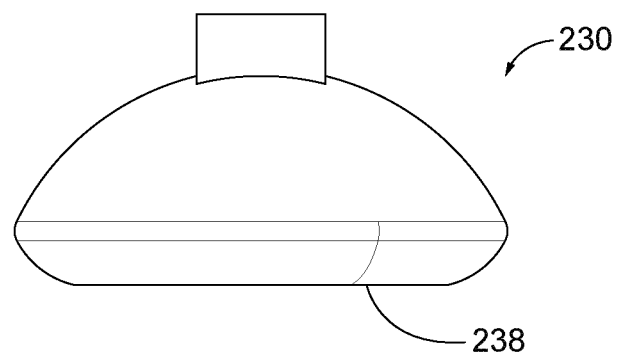
FIG. 12 is a front elevation view of the first illustrative foot of FIG. 10.

As seen in FIGS. 4-12, an articulating contact structure 200 is depicted and described. Articulating contact structure 200 is an example of an articulating contact structure 122, 124, 134, 144 suitable for use in desiccant racks such as desiccant rack 100 and systems such as system 300. FIG. 4 depicts articulating contact structure 200 in an assembled configuration, with feet 230 coupled to body 220. FIGS. 4-9 depict body 220, depicted without feet 230. FIGS. 10-12 depict feet 230.

Articulating contact structure 200 comprises a body 220 comprising a central hub 222 and at least three legs 224 extending from the central hub. Body 220 may be interchangeably referred to as a tripod structure, but articulating contact structures in accordance with the present teachings may comprise any suitable number of legs, such as three, four, five, and/or the like. Articulating contact structure 200 further comprises a pivotable joint 210 coupled to central hub 222 opposite legs 224. In the example depicted in FIGS. 4-12, pivotable joint 210 comprises a ball-and-socket joint. However, other suitable joints may be envisaged, such as a ball joint, a revolute joint, and/or the like. As pivotable joint 210 comprises a ball-and-socket joint, body 220 may be freely rotated about the pivotable joint (i.e., has three degrees of freedom). In the example depicted in FIGS. 4-12, central hub 222 of body 220 comprises a socket 214 of pivotable joint 210. Accordingly, ball 212 is configured to be coupled to platform 110 of desiccant rack 100. As described above, ball 212 may be coupled to a rung 118 such that articulating contact structure 200 forms an edge region of the platform. However, in another example, central hub 222 of body 220 comprises a ball of pivotable joint 210, and a socket of the pivotable joint is configured to be coupled to platform 110 of desiccant rack 100.

In the example depicted in FIGS. 4-9, body 220 comprises three legs 224 extending from a central hub 222. However, bodies in accordance with the present teachings may comprise any suitable number of legs 224 extending from central hub 222, such as three, four, five, and/or the like. Legs 224 extend from central hub 222 in a direction opposite pivotable joint 210. Body 220 comprises a plurality of struts 232 extending between each pair of legs 224, which reinforce and support the body. However, an articulating contact structure omitting struts 232 could be envisaged.

As depicted in FIG. 4, each leg 224 of body 220 further comprises a respective foot 230 and a respective pivotable leg joint 226. Each foot 230 is coupled to leg 224 by a pivotable leg joint 226. In some examples, pivotable leg joint 226 is a ball-and-socket joint. Accordingly, each foot 230 may be freely rotated about leg 224 (i.e., has three degrees of freedom). However, other suitable joints may be envisaged, such as a ball joint, a revolute joint, and/or the like. In examples where pivotable leg joint 226 is a revolute joint, articulating contact structure 200 is freely pivotable about pivotable joint 210, and each respective pivotable leg joint 226 has a single degree of freedom. In the example depicted in FIGS. 4-12, each leg 224 is coupled to a ball 234 of pivotable leg joint 226, and foot 230 is coupled to socket 236 of the pivotable leg joint. However, in some examples, each leg 224 is coupled to a socket of the pivotable leg joint, and each foot is coupled to a ball of the pivotable leg joint.

In the example depicted in FIG. 4, a foot 230 is coupled to socket 236 by a post 240 and a hole 242 mated in an interference fit. However, foot 230 may be coupled to body 220 by any suitable coupling mechanism, such as an interference fit, bolts, pins, screws, and/or the like. In some examples, each foot 230 is permanently coupled to body 220. In some examples, foot 230 is substantially semispherical. As depicted in FIGS. 10-12, foot 230 has a substantially semispherical body and a contact surface 238 configured to contact nonplanar wall 154. In some examples, contact surface 238 is substantially planar. In some examples, contact surface 238 is rounded and/or contoured to mimic a contour of nonplanar wall 54.

In some examples, each foot 230 of articulating contact structure 200 is configured to contact nonplanar wall 154 when in use, such that each articulating contact structure has a number of points of contact with the nonplanar wall equal to the number of legs extending from central hub 222. In the example depicted in FIGS. 4-12, articulating contact structure 200 has three legs 224 and three points of contact with the nonplanar wall. As each body 220 may be rotated about pivotable joint 210 and each foot 230 may be rotated about a respective pivotable leg joint 226, each articulating contact structure is adjustable. Each edge region of a desiccant rack including articulating contact structures such as articulating contact structure 200 is configured to conform to a nonplanar surface having any suitable shape. Articulating contact structures such as articulating contact structure 200 may facilitate increased contact between linear edge regions (e.g., edge regions 112, 114, 132, 142) and nonplanar wall 154.

Feet 230 may comprise any material suitable for providing a contact surface with a housing of an aircraft structure. In some examples, feet 230 comprise materials configured to provide a smooth contact surface, such as aluminum, steel, PVC (polyvinylidene chloride), PET (polyethylene terephthalate), and/or the like. In some examples, feet 230 comprise resilient materials configured to provide a cushioned and/or adhesive contact surface, such as rubber, thermoplastic elastomers, and/or the like.

Figure 13:
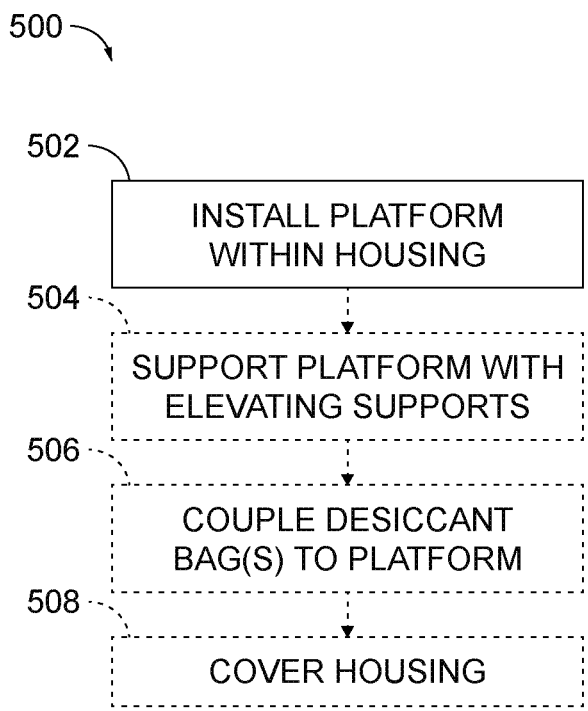
FIG. 13 is a flow chart schematically representing steps of an illustrative method for installing a system for preventing corrosion within a housing of an aerospace structure.

FIG. 13 schematically provides a flowchart that represents illustrative, non-exclusive examples of methods according to the present disclosure. In FIG. 13, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 13 are not limiting and other methods and steps are within the scope of the present disclosure, including methods having greater than or fewer than the number of steps illustrated, as understood from the discussions herein.

As seen in FIG. 13, a method 500 of installing a desiccant rack such as desiccant rack 100, as described above within a housing of an aerospace structure, such as housing 150 comprises: a step 502 of installing a platform, such as platform 110, of the desiccant rack, such as desiccant rack 100, within the housing such that first and second edge regions of the platform contact a nonplanar wall of the housing and the platform is suspended within the housing. In some examples, step 502 further comprises orienting the platform within the housing such that a plane defined by the platform is substantially horizontal. Accordingly, the installed desiccant rack is suspended by the nonplanar wall such that the platform provides a horizontal surface from which bags containing a desiccant material may be suspended. In some examples, a first edge region of the platform is defined by one or more first articulating contact structures, such as articulating contact structures 200, and a second edge region of the platform is defined by one or more second articulating contact structure, such as articulating contact structures 200. In some examples, the platform further comprises a pivotable joint, such as pivotable joint 210, coupling each articulating contact structure to the platform. Accordingly, each articulating contact structure may be pivotable about the pivotable joint, adjusting each edge region of the platform.

In some examples, step 502 further comprises pivoting each of the first articulating contact structures and the second articulating contact structures about a respective pivotable joint, such that each articulating contact structure contacts the nonplanar wall. Accordingly, method 500 may be suitable for installing desiccant racks within housings having curved, angled, amorphous, or irregular shapes, as the first and second articulating contact structures facilitate an adjustable interface between the desiccant rack and the nonplanar wall. In some examples, such as when the first and second articulating contact structures are substantially similar to articulating contact structures 200, each articulating structure comprises a body (e.g., a tripod structure) comprising a central hub, at least three legs extending from the central hub, and a respective foot coupled to each leg. In some examples, the body is coupled to the pivotable joint at the central hub. Accordingly, the body is pivotable with respect to the platform about the pivotable joint. In some examples, each foot is coupled to a respective leg by a pivotable leg joint. Accordingly, each foot is pivotable with respect to the body about the pivotable leg joint. In these examples, installing the platform within the housing comprises pivoting the articulating contact structures such that each foot of the articulating contact structure contacts the nonplanar wall.

As schematically illustrated in dashed lines in FIG. 13, a method 500 of installing a desiccant rack also may include a step 504 of supporting the platform with elevating supports. In some examples, the elevating supports are oriented substantially orthogonally to the platform. In some examples, supporting the platform includes placing the elevating supports on the nonplanar wall such that a distal edge region of each elevating support contacts the nonplanar wall. In some examples, the distal edge region of each elevating support is defined by one or more articulating contact structures, such as articulating contact structure 200. In some examples, the elevating support further comprises a pivotable joint, such as pivotable joint 210, coupling each articulating contact structure to the platform. Accordingly, each articulating contact structure may be pivotable about the pivotable joint, adjusting the distal edge region of each elevating support. In these examples, placing the elevating supports on the nonplanar wall includes adjusting (e.g., rotating, pivoting, etc.) the articulating contact structures such that each articulating contact structure contacts the nonplanar wall. In some examples, such as when the first and second articulating contact structures are substantially similar to articulating contact structures 200, each articulating structure comprises a body comprising a central hub, at least three legs extending from the central hub, and a respective foot coupled to each leg. Accordingly, the body is pivotable with respect to the elevating support about the pivotable joint. In some examples, each foot is coupled to a respective leg by a pivotable leg joint. Accordingly, each foot is pivotable with respect to the body about the pivotable leg joint. In these examples, supporting the platform with elevating supports comprises pivoting the articulating contact structures such that each foot of the body contacts the nonplanar wall. In some examples, step 504 and step 502 of method 500 are performed substantially simultaneously, as the platform and the elevating supports are portions of a unitary structure.

As schematically illustrated in dashed lines in FIG. 13, a method 500 of installing a desiccant rack may also include a step 506 of coupling one or more bags containing a desiccant material to the platform. In some examples, the one or more bags are coupled to the platform such that a largest face of each bag is parallel to an opening defined by the housing. In some examples, the one or more bags are coupled to the platform such that a largest face of each bag is orthogonal to an opening defined by a housing. In either example, a majority of a surface area of each bag is exposed to air within the housing, such that air is free to contact desiccant material within each bag. In contrast, conventional dehydration systems obscure large portions of a surface area of each bag containing a desiccant material, resulting in underutilization of the desiccant material.

In some examples, the platform is substantially similar to platform 110, described above. Accordingly, in some examples, the platform comprises a pair of rails and a plurality of rungs extending between the pair of rails. In some examples, each rail of the pair of rails is configured to extend from the first edge region of the platform to the second edge region of the platform. In some examples, coupling the one or more bags containing a desiccant material to the platform comprises coupling a first corner of each bag to a first rung of the plurality of rungs and coupling a second corner of each bag to a second rung of the plurality of rungs, such that a largest face of each bag is parallel to an opening defined by the housing. In some examples, coupling the one or more bags containing a desiccant material to the platform comprises coupling each bag to a rail of the pair of rails.

Coupling the one or more bags containing a desiccant material to the platform may comprise any suitable coupling method, such as tying, clipping, hooking, adhering, and/or the like. In some examples, coupling the one or more bags containing a desiccant material to the platform comprises tying each bag to the platform using ties. In some examples, the ties are integrated within the one or more bags, such that tying each bag to the platform includes tying ties extending from corners of the one or more bags to the platform. In some examples, coupling the one or more bags containing a desiccant material to the platform comprises attaching each bag to the platform using one or more clips.

As schematically illustrated in dashed lines in FIG. 13, a method 500 of installing a desiccant rack also may include a step 508 of covering the structure and/or the housing with a cover, such that the desiccant rack and bags of desiccant material are sealed within the housing. In some examples, covering the structure and/or the housing with a cover comprises obscuring an opening of the housing. In some examples, covering the structure and/or housing with a cover forms an airtight compartment containing the desiccant rack and the bags of desiccant material. As the bags of desiccant material are sealed within the compartment, air within the compartment is dehydrated by the bags of desiccant material.

Illustrative, non-exclusive examples of inventive subject matter according to the present disclosure are described in the following enumerated paragraphs:

A0. A desiccant rack (100) for suspending one or more bags (120) of a desiccant material within a housing (150) of an aerospace structure, the desiccant rack comprising:

a platform (110) comprising a first edge region (112) and a second edge region (114) opposite the first edge region, wherein the platform (110) is configured to contact a first portion of a nonplanar wall (154) of the housing (150) at the first edge region (112) and a second portion of the nonplanar wall (154) of the housing (150) at the second edge region (114), such that the platform (110) is suspended by the nonplanar wall (154).

A1. The desiccant rack of paragraph A0, wherein the platform (110) is configured to suspend one or more bags (120) of a desiccant material such that a largest face (121) of each bag (120) is oriented parallel to a plane defined by an opening (156) of the housing (150).

A1.1. The desiccant rack (100) of paragraph A1, wherein the platform (110) is configured to suspend one or more bags (120) of a desiccant material such that a largest face (121) of each bag (120) is oriented parallel to a face of an engine (152) received by the housing (150).

A2. The desiccant rack (100) of paragraph A1, wherein the platform (110) is configured to suspend one or more bags (120) of a desiccant material such that a largest face (121) of each bag (120) is oriented parallel to a face of an engine (152) received by the housing (150).

A3. The desiccant rack (100) of any of paragraphs A0 through A2, wherein the housing (150) comprises an engine cowling.

A4. The desiccant rack (100) of any of paragraphs A0 through A2, wherein the housing (150) comprises a nacelle (158) defining a cylindrical opening (156) receiving the platform (110).

A5. The desiccant rack (100) of any of paragraphs A0 through A4, wherein the platform (110) comprises a pair of rails (116) and a plurality of rungs (118) extending between the pair of rails (116), wherein each rail of the pair of rails (116) is configured to extend from the first edge region (112) of the platform (110) to the second edge region (114) of the platform (110).

A5.1. The desiccant rack (100) of paragraph A5, wherein the first edge region (112) of the platform (110) comprises a first rung (126) of the plurality of rungs (118) and wherein the second edge region (114) of the platform (110) comprises a second rung (128) of the plurality of rungs (118).

A5.1.1. The desiccant rack (100) of any of paragraphs A5 through A5.1.2, further comprising a coupling mechanism (168) configured to couple each bag (120) to the desiccant rack (100).

A5.1.2. The desiccant rack (100) of paragraph A5.1.1, wherein the coupling mechanism (168) comprises one or more clips.

A6. The desiccant rack (100) of any of paragraphs A0 through A5.1.2, wherein the platform (110) is configured to be oriented substantially horizontally when installed within the housing (150).

A7. The desiccant rack (100) of any of paragraphs A0 through A6, wherein the first edge region (112) is defined by at least a first articulating contact structure (122) coupled to the first rung (126), and wherein the second edge region (114) is defined by at least a second articulating contact structure (124) coupled to the second rung (128).

A7.1. The desiccant rack (100) of paragraph A7, further comprising a pivotable joint (210) coupling each articulating contact structure (122/124) to a respective rung (126/128) of the desiccant rack (100).

A7.1.1. The desiccant rack (100) of paragraph A7.1, wherein the pivotable joint (210) is a ball-and-socket joint.

A7.2. The desiccant rack (100) of paragraph A7.1 or A7.1.1, wherein each articulating contact structure (200) comprises a body (220) comprising a central hub (222) and at least three legs (224) extending from the central hub (222).

A7.2.1. The desiccant rack (100) of paragraph A7.2, wherein the body (220) is coupled to the pivotable joint (210) at the central hub (222).

A7.2.2. The desiccant rack (100) of paragraph A7.2.1, wherein the at least three legs (224) extend from the central hub (222) in a direction opposite the pivotable joint (210).

A7.2.3. The desiccant rack (100) of any of paragraphs A7.2 through A7.2.2, wherein the central hub (222) comprises a socket (214) of a/the ball-and-socket joint.

A7.2.4. The desiccant rack (100) of any of paragraphs A7.2 through A7.2.3, wherein each leg (224) further comprises a respective foot (230) and a respective pivotable leg joint (226), wherein the foot (230) is coupled to the leg (224) of the body (220) by the pivotable leg joint (226).

A7.2.5. The desiccant rack (100) of paragraph A7.2.4, wherein each foot (230) is substantially semispherical.

A7.2.6. The desiccant rack (100) of any of paragraphs A7.2 through A7.2.5, wherein each foot (230) is configured to contact the nonplanar wall (154) when the desiccant rack (100) is installed within the housing (150), such that each articulating contact structure (200) has at least three points of contact with the nonplanar wall (154).

A7.3. The desiccant rack (100) of any of paragraphs A7 through A7.2.4, wherein the first edge region (112) is defined by a first plurality of articulating contact structures (122) spaced along the first rung (126), and wherein the second edge region (114) is defined by a second plurality of articulating contact structures (124/200) spaced along the second rung (128).

A8. The desiccant rack (100) of any of paragraphs A0 through A7.3, further comprising a first elevating support (130) extending substantially orthogonally from the platform (110), the first elevating support further comprising a third edge region (132) disposed at a distal end (133) of the first elevating support (130), such that the third edge region (132) of the first elevating support (130) contacts a third portion of the nonplanar wall (154).

A8.1. The desiccant rack (100) of paragraph A8, wherein the first elevating support (130) is oriented substantially vertically when the desiccant rack (100) is installed within the housing (150).

A8.1.1. The desiccant rack (100) of paragraph A8 or A8.1, wherein the third edge region (132) is defined by at least a third articulating contact structure (134).

A8.1.2. The desiccant rack (100) of paragraph A8.1.1, further comprising a pivotable joint (210) coupling the third articulating contact structure (134) to the distal end (133) of the first elevating support (130).

A8.1.3. The desiccant rack (100) of paragraph A8.1.2, wherein the pivotable joint (210) is a ball-and-socket joint.

A8.2. The desiccant rack (100) of any of paragraphs A8.1.1 through A8.1.3, wherein the third articulating contact structure (134) comprises a body (220) comprising a central hub (222) and at least three legs (224) extending from the central hub (222).

A8.2.1. The desiccant rack (100) of paragraph A8.2, wherein the body (220) is coupled to the pivotable joint (210) at the central hub (222).

A8.2.2. The desiccant rack (100) of paragraph A8.2.1, wherein the at least three legs (224) extend from the central hub (222) in a direction opposite the pivotable joint (210).

A8.2.3. The desiccant rack (100) of any of paragraphs A8.2 through A8.2.2, wherein the central hub (222) comprises a socket (214) of a/the ball-and-socket joint.

A8.2.4. The desiccant rack (100) of paragraph any of paragraphs A8.2 through A8.2.3, wherein each leg (224) further comprises a respective foot (230) and a respective pivotable leg joint (226), wherein the foot (230) is coupled to the leg (224) of the body (220) by the pivotable leg joint (226).

A8.2.5. The desiccant rack (100) of paragraph A8.2.4, wherein each foot (230) is substantially semispherical.

A8.2.6. The desiccant rack (100) of any of paragraphs A8.2 through A8.2.5, wherein each foot (230) is configured to contact the nonplanar wall (154) when the desiccant rack (100) is installed within the housing (150), such that each articulating contact structure (200) has at least three points of contact with the nonplanar wall (154).

A8.3. The desiccant rack (100) of any of paragraphs A8.1.1 through A8.2.6, wherein the third edge region (132) is defined by a third plurality of articulating contact structures (134) spaced along the distal end (133) of the first elevating support (130).

A8.4. The desiccant rack (100) of any of paragraphs A8 through A8.3, further comprising a second elevating support (140) extending substantially orthogonally from the platform (110), the second elevating support further comprising a fourth edge region (142) disposed at a distal end (143) of the second elevating support (140), such that the fourth edge region (142) of the second elevating support (140) contacts a fourth portion of the nonplanar wall (154).

A8.4.1. The desiccant rack (100) of paragraph A8.4, wherein the fourth edge region (142) is defined by at least a fourth articulating contact structure (144).

A8.4.2. The desiccant rack (100) of paragraph A8.4.1, further comprising a pivotable joint (210) coupling the fourth articulating contact structure (144) to the distal end (143) of the second elevating support (140).

A8.4.3. The desiccant rack (100) of paragraph A8.4.2, wherein the pivotable joint (210) is a ball-and-socket joint.

A8.5. The desiccant rack (100) of any of paragraphs A8.4.1 through A8.4.3, wherein the fourth articulating contact structure (144) comprises a body (220) comprising a central hub (222) and at least three legs (224) extending from the central hub (222).

A8.5.1. The desiccant rack (100) of paragraph A8.5, wherein the body (220) is coupled to the pivotable joint (210) at the central hub (222).

A8.5.2. The desiccant rack (100) of paragraph A8.5.1, wherein the at least three legs (224) extend from the central hub (222) in a direction opposite the pivotable joint (210).

A8.5.3. The desiccant rack (100) of any of paragraphs A8.5 through A8.5.2, wherein the central hub (222) comprises a socket (214) of a/the ball-and-socket joint.

A8.5.4. The desiccant rack (100) of any of paragraphs A8.5 through A8.5.3, wherein each leg (224) further comprises a respective foot (230) and a respective pivotable leg joint (226), wherein the foot (230) is coupled to the leg (224) of the body (220) by the pivotable leg joint (226).

A8.5.5. The desiccant rack (100) of paragraph A8.5.4, wherein each foot (230) is substantially semispherical.

A8.5.6. The desiccant rack (100) of any of paragraphs A8.5 through A8.5.5, wherein each foot (230) is configured to contact the nonplanar wall (154) when the desiccant rack (100) is installed within the housing (150), such that each articulating contact structure (200) has at least three points of contact with the nonplanar wall (154).

A8.6. The desiccant rack (100) of any of paragraphs A8.4.1 through A8.5.6, wherein the fourth edge region (142) is defined by a fourth plurality of articulating contact structures (144) spaced along the distal end (143) of the second elevating support (140).

A9. An engine cowling including the desiccant rack (100) of any of paragraphs A0 through A8.6.

B0. A system (300) for preventing corrosion within a housing (150) of a structure, the system (300) comprising:
the desiccant rack (100) of any of paragraphs A0 through A9; and
one or more bags (120) containing a desiccant material, wherein each bag (120) is suspended from the platform (110).

B1. The system (300) of paragraph B0, wherein each bag (120) of the one or more bags is suspended between a pair of rungs of the plurality of rungs (118).

B1.1. The system (300) of paragraph B0, wherein each bag (120) of the one or more bags is suspended from a rail of the pair of rails (116).

B1.2. The system (300) of any of paragraphs B0 through B1.1, further comprising a coupling mechanism (168) comprising one or more ties extending from each bag, wherein each bag (120) is coupled to the platform (110) by the one or more ties.

B1.3. The system (300) of any of paragraphs B0 through B1.1, further comprising a coupling mechanism (168) comprising one or more clips, wherein each bag (120) is coupled to the platform by the one or more clips.

B2. The system (300) of any of paragraphs B0 through B1.3, further comprising a cover (160) configured to obscure the opening (156) of the housing, such that the desiccant rack (100) and the bags (120) of desiccant material are sealed within a compartment defined by the cover (160) and the housing (150) when the cover (160) is installed.

B3. The system (300) of any of paragraphs B0 through B2, wherein the one or more bags (120) containing a desiccant material are suspended from platform (110) such that a largest face (121) of each bag is oriented parallel to a plane (151) defined by an opening of the housing (150).

B4. The system (300) of any of paragraphs B0 through B2, wherein the one or more bags (120) containing a desiccant material are suspended from platform (110) such that a largest face (121) of each bag is oriented orthogonal to a plane (151) defined by an opening of the housing (150).

C0. A method of installing the desiccant rack (100) of any of paragraphs A0 through A9 within a housing (150) of an aerospace structure, the method comprising:
installing a platform (110) of the desiccant rack (100) within the housing (150) such that first (112) and second (114) edge regions of the platform (110) contact a nonplanar wall (154) of the housing (150) and the platform (110) is suspended within the housing (150).

C1. The method of paragraph C0, wherein installing the platform (110) within the housing (150) further comprises orienting the platform (110) such that a plane defined by the platform (110) is substantially horizontal.

C2. The method of paragraph C0 or C1, wherein the first edge region (112) is defined by one or more first articulating contact structures (122), and wherein the second edge region (114) is defined by one or more second articulating contact structures (124).

C2.1. The method of paragraph C2, further comprising a pivotable joint (210) coupled to each of the one or more first articulating contact structures (122) and each of the one or more second articulating contact structures (124).

C2.2. The method of paragraph C2.1, wherein installing the platform (110) within the housing (150) comprises pivoting each of the first and second articulating contact structures (200) about the pivotable joint (210) such that each articulating contact structure contacts the nonplanar wall (154).

C2.3. The method of paragraph C2.2, wherein each articulating contact structure (200) comprises a body (220) comprising a central hub (222), at least three legs (224) extending from the central hub (222), and a respective foot (230) coupled to each leg, and wherein the body (220) is coupled to the pivotable joint (210) at the central hub.

C2.4. The method of paragraph C2.3, wherein installing the platform (110) within the housing (150) comprises pivoting the articulating contact structures (200) such that each foot (230) of the articulating contact structure (200) contacts the nonplanar wall (154).

C2.5. The method of paragraph C.2.3 or C.2.4, wherein installing the platform (110) within the housing (150) comprises pivoting the articulating contact structures (200) such that each structure has at least three points of contact with the nonplanar wall (154).

C3. The method of any of paragraphs C0 through C2.5, further comprising supporting the platform (110) with elevating supports (130/140) oriented substantially orthogonally to the platform (110).

C4. The method of any of paragraphs C0 through C3, further comprising coupling one or more bags (120) containing a desiccant material to the platform (110) such that a largest face (121) of each bag (120) is parallel to an opening (156) defined by the housing (150).

C4.1. The method of paragraph C4, wherein the platform (110) comprises a pair of rails (116) and a plurality of rungs (118) extending between the pair of rails (116), wherein each rail (116) of the pair of rails (116) is configured to extend from the first edge region (112) of the platform (110) to the second edge region (114) of the platform (110).

C4.1.1. The method of paragraph C4.1, wherein coupling the one or more bags (120) containing a desiccant material to the platform (110) comprises coupling a first corner (162) of each bag (120) to a first rung of the plurality of rungs (118) and coupling a second corner (164) of each bag (120) to a second rung of the plurality of rungs (118).

C4.1.2. The method of paragraph C4.1, wherein coupling the one or more bags (120) containing a desiccant material to the platform (110) comprises coupling each bag (120) to a rail of the pair of rails (116).

C4.2. The method of any of paragraphs C4 through C4.1.2, wherein coupling the one or more bags (120) containing a desiccant material to the platform (110) comprises tying each bag to the platform (110).

C4.3. The method of any of paragraphs C4 through C4.1.2, wherein coupling the one or more bags (120) containing a desiccant material to the platform (110) comprises attaching each bag to the platform with clips.

C5. The method of any of paragraphs C0 through C4.3, further comprising covering the housing (150) with a cover (160) such that the desiccant rack (100) and bags (120) of desiccant material are sealed within the housing (150).

C5.1. The method of paragraph C5, wherein covering the housing (150) with a cover (160) comprises obscuring an/the opening (156) of the housing (150).

D0. An articulating contact structure (200) comprising:
a body (220) comprising a central hub (222) and at least three legs (224) extending from the central hub (222); and
a pivotable joint (210) coupled to the central hub (222) opposite the at least three legs (224).

D1. The articulating contact structure (200) of paragraph D0, wherein the pivotable joint (210) comprises a ball-and-socket joint.

D1.1. The articulating contact structure (200) of paragraph D1, wherein the central hub (222) of the body (220) comprises a socket (214) of the ball-and-socket joint.

D2. The articulating contact structure (200) of any of paragraphs D0 through D1, further comprising a plurality of struts (232) extending between each pair of legs of the at least three legs (224).

D3. The articulating contact structure (200) of any of paragraphs D0 through D2, wherein the at least three legs (224) extend from the central hub (222) in a direction opposite the pivotable joint (210).

D4. The articulating contact structure (200) of any of paragraphs D0 through D3, wherein each leg (224) further comprises a respective foot (230) and a respective pivotable leg joint (226), wherein the foot (230) is coupled to the leg (224) of the body (220) by the pivotable leg joint (226).

D4.1. The articulating contact structure (200) of paragraph D4, wherein each pivotable leg joint (226) is a ball-and-socket joint.

D4.1.1. The articulating contact structure (200) of paragraph D4.1, wherein the leg (224) is coupled to a ball (234) of the ball-and-socket joint.

D4.1.2. The articulating contact structure (200) of paragraph D4.1 or D4.1.1, wherein the foot (230) is coupled to a socket (236) of the ball-and-socket joint.

D4.1.3. The articulating contact structure (200) of paragraph D4.1.2, wherein the foot (230) is coupled to the socket (236) by a post (240) and hole (242) mated in an interference fit.

D4.2. The articulating contact structure (200) of any of paragraphs D4 through D4.1.2, wherein each foot (230) is substantially semispherical.

D4.2.1. The articulating contact structure (200) of paragraph D4.2, further comprising a substantially planar contact surface (238) configured to contact a nonplanar wall (154).

D4.3. The articulating contact structure (200) of any of paragraphs D4 to D4.2.1, wherein each foot (230) is configured to contact a nonplanar wall (154) when in use, such that each articulating contact structure (200) has at least three points of contact with the nonplanar wall (154).

E0. The desiccant rack (100) of any of paragraphs A0 through A9, further comprising the articulating contact structure (200) of any of paragraphs D0 through D4.3.

F0. The system (300) of any of paragraphs B0 through B2, further comprising the articulating contact structure (200) of any of paragraphs D0 through D4.3.

G0. A method of installing the desiccant rack (100) of any of paragraphs A0 through A9.

H0. A method of installing the system (300) of any of paragraphs B0 through B2.

I0. The use of the desiccant rack (100) of any of paragraphs A0 through A9.

J0. The use of the system (300) of any of paragraphs B0 through B2.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A desiccant rack for suspending one or more bags of a desiccant material within a housing of an aerospace structure, the desiccant rack comprising:
 a platform comprising:
  a first edge region and a second edge region opposite the first edge region, wherein the platform is configured to contact a first portion of a nonplanar wall of the housing at the first edge region and a second portion of the nonplanar wall of the housing at the second edge region, such that the platform is suspended by the nonplanar wall;
  a pair of rails and a plurality of rungs extending between the pair of rails, wherein each rail of the pair of rails is configured to extend from the first edge region of the platform to the second edge region of the platform, wherein the first edge region of the platform comprises a first rung of the plurality of rungs and wherein the second edge region of the platform comprises a second rung of the plurality of rungs;
 wherein the first edge region is defined by at least a first articulating contact structure coupled to the first rung by a first pivotable joint, and wherein the second edge region is defined by at least a second articulating contact structure coupled to the second rung by a second pivotable joint; and
 wherein the first articulating contact structure and the second articulating contact structure each comprise a body comprising a central hub and at least three legs extending from the central hub, wherein the body is coupled to a respective pivotable joint of the first and second pivotable joints at the central hub.

2. The desiccant rack of claim 1, wherein the platform is configured to suspend the one or more bags of the desiccant material such that a largest face of each bag is oriented parallel to a plane defined by an opening of the housing.

3. The desiccant rack of claim 1, wherein each leg further comprises a respective foot and a respective pivotable leg joint, wherein the foot is coupled to the leg of the body by the pivotable leg joint.

4. The desiccant rack of claim 3, wherein each foot is configured to contact the nonplanar wall when the desiccant rack is installed within the housing, such that each articulating contact structure has at least three points of contact with the nonplanar wall.

5. The desiccant rack of claim 1, wherein the first edge region is defined by a first plurality of articulating contact structures including the at least the first articulating contact structure spaced along the first rung, and wherein the second edge region is defined by a second plurality of articulating contact structures including the at least the second articulating contact structure spaced along the second rung.

6. The desiccant rack of claim 1, further comprising a first elevating support extending substantially orthogonally from the platform, the first elevating support further comprising a third edge region disposed at a distal end of the first elevating support, such that the third edge region of the first elevating support contacts a third portion of the nonplanar wall.

7. The desiccant rack of claim 6, further comprising a second elevating support extending substantially orthogonally from the platform, the second elevating support further comprising a fourth edge region disposed at a distal end of the second elevating support, such that the fourth edge region of the second elevating support contacts a fourth portion of the nonplanar wall.

8. A system for preventing corrosion within a housing of a structure, the system comprising:
 the desiccant rack of claim 1; and
 the one or more bags containing the desiccant material, wherein each bag is suspended from the platform.

9. The system of claim 8, wherein at least one bag of the one or more bags containing the desiccant material is suspended such that a largest face of each the at least one bag of the one or more bags containing the desiccant material is oriented parallel to a plane defined by an opening of the housing.

10. The system of claim 8, further comprising a cover configured to obscure an opening of the housing, such that the desiccant rack and the bags containing the desiccant material are sealed within a compartment defined by the cover and the housing when the cover is installed.

11. A method of installing the desiccant rack of claim 1 within the housing of the aerospace structure, the method comprising:
 installing the platform of the desiccant rack within the housing such that the first and the second edge regions of the platform contact the nonplanar wall of the housing and the platform is suspended within the housing.

12. The method of claim 11, wherein installing the platform within the housing further comprises orienting the platform such that a plane defined by the platform is substantially horizontal.

13. The method of claim 11, wherein installing the platform of the desiccant rack within the housing comprises causing the one or more first articulating contact structures to contact the nonplanar wall of the housing, and wherein installing the platform of the desiccant rack within the housing comprises causing the one or more second articulating contact structures to contact the nonplanar wall of the housing.

14. The method of claim 11, further comprising supporting the platform with elevating supports oriented substantially orthogonally to the platform.

15. The method of claim 11, further comprising coupling at least one bag of the one or more bags containing the desiccant material to the platform such that a largest face of the at least one bag of the one or more bags containing the desiccant material is parallel to an opening defined by the housing.

16. The desiccant rack of claim 1, further comprising a coupling mechanism configured to couple the one or more bags to the desiccant rack.

17. The desiccant rack of claim 1, wherein the pivotable joint is a ball-and-socket joint.

18. The desiccant rack of claim 17, wherein the central hub comprises a socket of the ball-and-socket joint.

19. The desiccant rack of claim 6, wherein the third edge region is defined by at least a third articulating contact structure.

20. The desiccant rack of claim 19, further comprising a pivotable joint coupling the third articulating contact structure to the distal end of the first elevating support.

* * * * *